United States Patent
Brown et al.

(10) Patent No.: US 10,356,497 B1
(45) Date of Patent: Jul. 16, 2019

(54) REMOVABLE ENVIRONMENTAL MICROPHONE AND RADIO COVER ASSEMBLY

(71) Applicant: Ian Brown, Jurupa Valley, CA (US)

(72) Inventors: Ian Brown, Jurupa Valley, CA (US); Shaun Kjellman, Kirkland, WA (US)

( * ) Notice: Subject to any disclaimer, the term of this patent is extended or adjusted under 35 U.S.C. 154(b) by 0 days.

(21) Appl. No.: 16/177,018

(22) Filed: Oct. 31, 2018

(51) Int. Cl.
| | |
|---|---|
| H04B 1/38 | (2015.01) |
| H04R 1/02 | (2006.01) |
| H04R 1/04 | (2006.01) |
| H04B 1/3827 | (2015.01) |

(52) U.S. Cl.
CPC .......... *H04R 1/023* (2013.01); *H04B 1/3833* (2013.01); *H04R 1/025* (2013.01); *H04R 1/04* (2013.01)

(58) Field of Classification Search
CPC .............................. H04B 1/3833; H04R 1/023
USPC ........................................................ 455/90.2
See application file for complete search history.

(56) References Cited

U.S. PATENT DOCUMENTS

| | | | | |
|---|---|---|---|---|
| 5,023,936 A | * | 6/1991 | Szczutkowski | H04B 1/3833 455/128 |
| 5,265,264 A | * | 11/1993 | Dzung | H04B 1/3883 455/234.1 |
| 6,844,845 B1 | * | 1/2005 | Whiteside | H05K 5/061 342/357.64 |
| 6,871,144 B1 | * | 3/2005 | Lee | G01C 21/20 340/539.32 |
| 6,925,315 B2 | * | 8/2005 | Langford | H04M 1/23 379/433.01 |
| 6,959,203 B2 | * | 10/2005 | Claxton | H04B 1/3877 455/556.1 |
| 7,146,187 B2 | * | 12/2006 | Richards | H04B 1/3805 455/556.1 |
| 7,412,226 B2 | * | 8/2008 | Kayzar | H04M 1/27455 379/37 |
| 7,509,099 B2 | * | 3/2009 | Kayzar | H04M 1/0202 455/518 |
| 2004/0263479 A1 | * | 12/2004 | Shkolnikov | G06F 1/1626 345/169 |
| 2005/0064822 A1 | * | 3/2005 | Higgins | G06Q 20/367 455/90.2 |
| 2005/0181745 A1 | * | 8/2005 | Wood | H04B 1/3888 455/90.3 |
| 2009/0197545 A1 | * | 8/2009 | Gong | H04B 1/3833 455/90.2 |
| 2010/0151911 A1 | * | 6/2010 | Mazzeo | H04M 1/0214 455/566 |

(Continued)

*Primary Examiner* — April G Gonzales
(74) *Attorney, Agent, or Firm* — Michael O'Brien; Johan Eide

(57) ABSTRACT

A removable microphone and radio cover assembly is claimed for use in challenging or rugged environments to improve the consistency of communication. The removable microphone cover comprises of a main cover, layers of interchangeable media, a spacer and an attachment tab. In some configurations, the removable cover assembly may consist of multiple main covers or the main cover with a mounting assembly. It is desirable, therefore, to have a removable cover for handheld communication devices that can be manipulated, oriented or changed to adapt to changes in environmental conditions. It is also desirable for the user to be able to attach, cover or mount the removable cover on different or multiple handheld communications devices as needed.

21 Claims, 10 Drawing Sheets

(56) References Cited

U.S. PATENT DOCUMENTS

| | | | | |
|---|---|---|---|---|
| 2010/0203849 A1* | 8/2010 | Straub | ............... | H04B 1/38 455/90.2 |
| 2011/0281533 A1* | 11/2011 | Deleus | ............... | G06F 3/0338 455/90.2 |
| 2013/0273944 A1* | 10/2013 | Wilson | ............... | H04W 4/90 455/457 |
| 2013/0281034 A1* | 10/2013 | Mazzeo | ............... | H04W 4/10 455/90.2 |
| 2014/0315502 A1* | 10/2014 | Lassally | ............... | H04B 1/44 455/90.2 |
| 2015/0147982 A1* | 5/2015 | Aihsan | ............... | H04B 1/3833 455/90.2 |
| 2015/0173497 A1* | 6/2015 | Yu | ............... | A45F 5/00 224/218 |
| 2015/0207206 A1* | 7/2015 | Bartholomew | ............... | H04B 1/3833 455/90.2 |
| 2016/0234356 A1* | 8/2016 | Thomas | ............... | H05K 9/0069 |

\* cited by examiner

REMOVABLE ENVIRONMENTAL MICROPHONE AND RADIO COVER ASSEMBLY

BACKGROUND

Handheld communication devices including satellite phones, CB radios, and walkie-talkies are widely used in controlled and variable environmental conditions to establish communication between at least two parties. Environmental conditions are out of the control of the user and often impact the reliability of transmission while using handheld communication devices. Examples of detrimental environmental conditions are wind, rain, electromagnetic fields, fog, dew, dust, sand, living organisms, plant matter, and many other conditions. The physical designs of handheld communication devices are optimized for the hand of the user and often require the user to speak into the device in a different orientation than when the user is required to listen for sound emitted from the device. Similarly, the handheld communication device may be wearable or attached to a fixed object when not in use. These simple changes in orientation, environmental conditions, and accumulation of debris can cause confusion, change in the user's ability to clearly hear sounds emitted from the device and take the user's attention away from the task at hand.

In operation, a user typically initiates the use of handheld communication device by depressing a button, switching a switch or speaking voice commands recognizable by an internal processing unit into the microphone portion of the handheld communication device. If the user can not easily locate the switch or button the consistency of clear transmission is reduced greatly. It is desirable, therefore, to have a housing or cover for handheld communication devices that directs the user's appendages to consistently depress, touch or switch buttons or switch that initiates communication. Similarly, if the user can not clearly communicate a voice command to the internal processing unit of handheld communication devices then repetitive, incomplete or incorrect communications can be made.

Two-way radios may need to be used in noisy environments, such as in the locomotive of a train or by the operator of heavy equipment such as tractors, wrecking balls, and cranes. The operators of the equipment may need guidance from those that are closer to a particular event or for other reasons to have a better view or have more information related to one or more consequences of the operations of the equipment. Consequently, it may be important that the operator of the heavy equipment be able to hear a two-way radio, via which the operator of the equipment receives communications from another worker that is monitoring the effects of the operations. However, due to the noise of the environment, the operator may not hear the two-way radio, and not know to stop or alter the operations currently in progress. For example, a train operator may run a red light, if the red light is not visible soon enough and the train operator does not hear his/her two-way radio.

SUMMARY

It is desirable, therefore, to have a removable cover for handheld communication devices that can be manipulated, oriented or changed to adapt to changes in environmental conditions. It is also desirable for the user to be able to attach, cover or mount the removable cover on different or multiple handheld communications devices as needed. The ability to detach and re-attach a cover to handheld communication devices additionally allows the user the ability to change components of the removable cover assembly to meet desired amplification, protection, muffling, buffering, filtering or cleaning requirements as the task at hand, environmental conditions or location of tasks for the user change. The ability to interchange components of a removable cover assembly for handheld communication devices also allows the user to change the stored location of the device when not in use and clean the interchangeable layers as they collect unwanted debris. This allows for a number of different mounting locations for the device on the body of the user or on structures nearby the user, by simply changing out components of a cover assembly.

The present invention is directed towards a removable cover assembly for use with handheld communication devices. The teaching and disclosure of this application are not directed towards mobile cellular devices or touchscreen mobile devices with microphones. The removable cover assembly can attach, cover or clamp onto the handheld communication device through, but not limited to, the following means: flexible slip-on means, clamping or latching means, fasteners, magnetic means, clip-on tabs or any combination thereof. The attaching, covering or clamping means allow for the removable cover assembly to correctly align the layers of interchangeable media, spacer and main cover to have a parallel face with the speaker or microphone side of the handheld communication device. The orientation of attachment for the removable cover assembly in the current exemplary embodiment is positioned to be pressed over the front side of a handheld communication device with clipping tabs reaching to the opposing or rear side of the handheld device. The direction of the attachment tabs of the removable cover assembly may differ between embodiments and different external shapes of hand-held radios.

The removable cover assembly is comprised of the main cover, an external layer or layers of interchangeable media, a spacing gasket and the handheld communication device itself. The various embodiments of the main cover allow for partial and full protection from outside contaminants and environmental conditions.

BRIEF DESCRIPTION OF THE FIGURES

The detailed description of some embodiments of the invention is made below with reference to the accompanying figures, wherein like numerals represent corresponding parts of the figures.

FIG. 1 shows an exemplary perspective view of one wired embodiment of the removable cover assembly in.

DETAILED DESCRIPTION OF CERTAIN EMBODIMENTS

Figure 1:
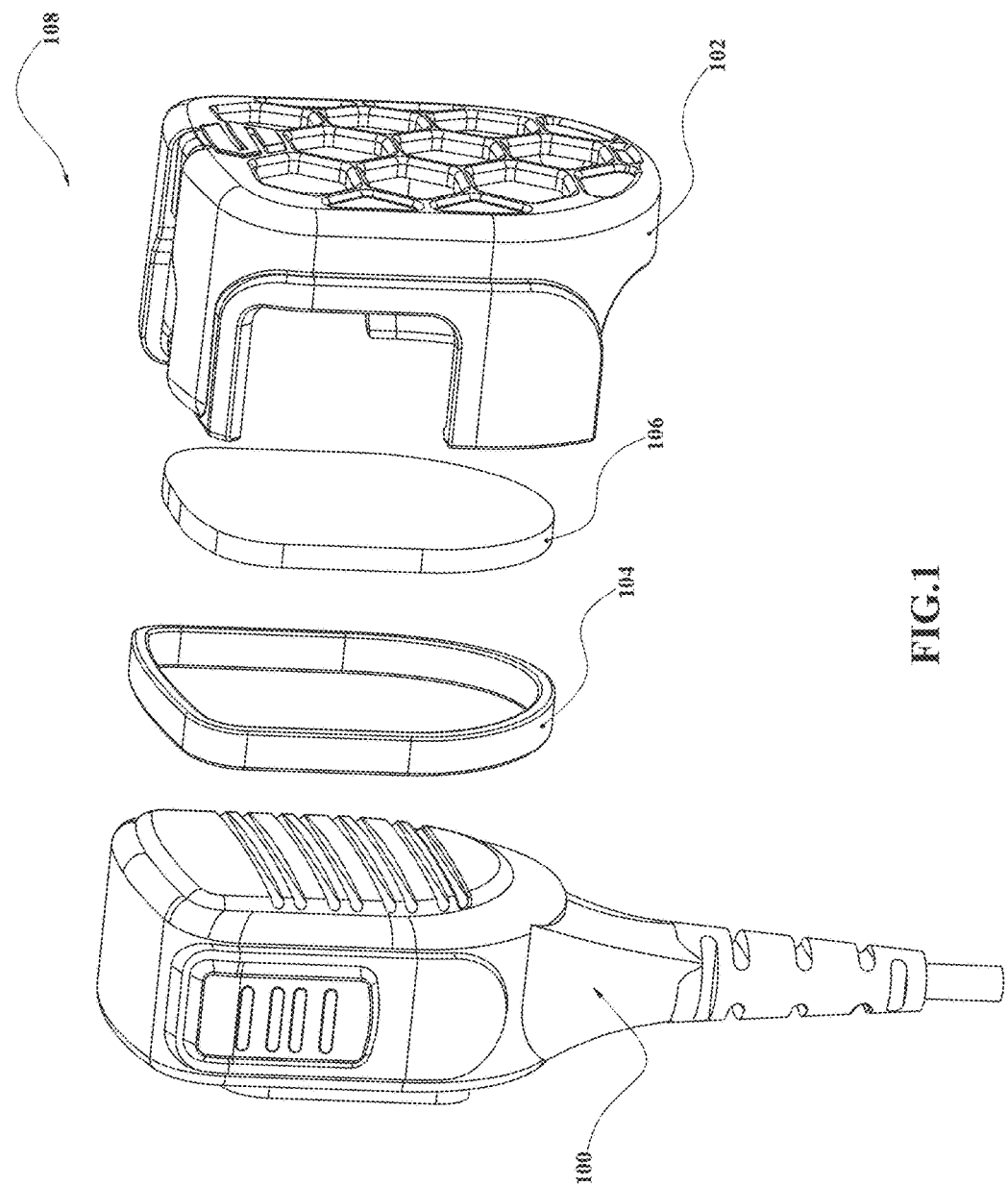

In regard to the current invention, FIG. 1 shows an exemplary perspective view of the removable radio cover assembly 108 and the assemblies' respective components. FIG. 1 illustrates the current exemplary embodiment of the removable radio cover assembly 108 in an expanded view showing an embodiment with a wired handheld communication device 100 and a interchangeable media layer 106. The removable radio cover assembly comprises a main cover, a interchangeable media layer 106 or 107, a spacer component 104 and a handheld communication device 100 or 110 that the removable radio cover attaches to when in use. The handheld communication devices 100 or 110 in the teaching of this invention is not directed towards a device with cellular connectivity or a device comprising a touchscreen. The handheld communication device 100 or 110 utilizing the removable cover assembly 108 in the current exemplary embodiment is at least one member of a push to talk radio set consisting of: a satellite transceiver, a satellite phone, a CB radio, a walkie-talkie, a GPS device, a barcode scanner, a two-way radio, an RF device, an intercom device, a portable speaker, and a handheld microphone. The ideal area use of the current embodiment of the removable radio cover assembly 108 may be outdoor, noisy, impaired or abnormal environmental conditions requiring, but not limited to, the following sound altering means: amplification, blocking, filtering, reducing, collecting or any combination thereof. The handheld communication device 100 or 110 may be of an embodiment powered by wired means 100 or wireless means 110. Exemplary wireless power means or wireless embodiments 110 consisting of: wireless charging coils, a battery or plurality of batteries, solar power or any combination thereof.

Figure 1A:
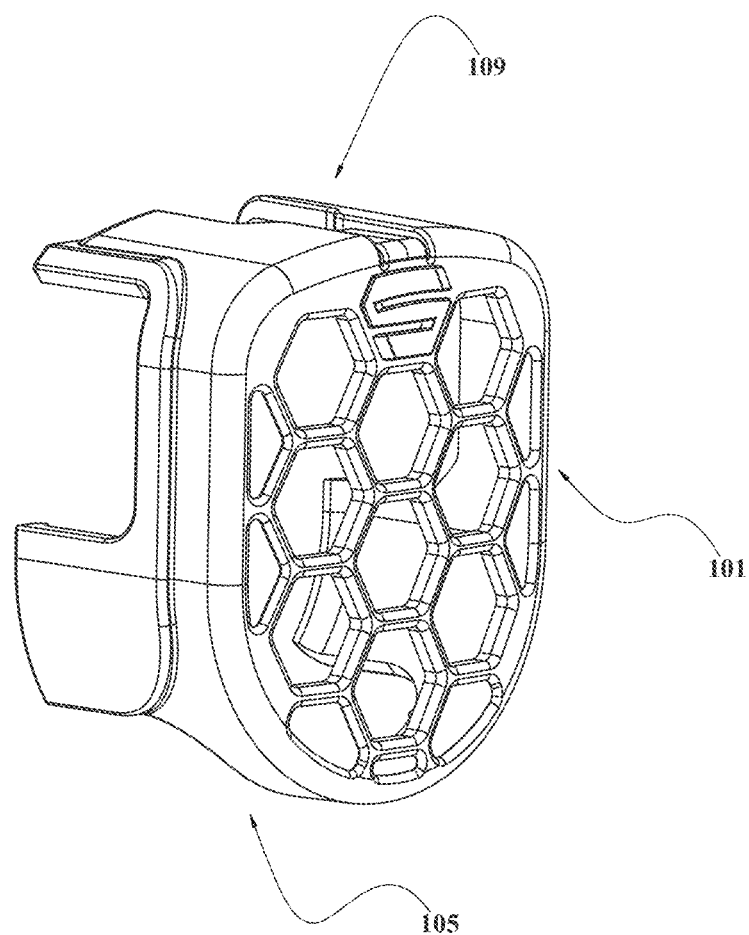
FIG. 1A shows an exemplary embodiment of the radio cover assembly in perspective view and the orientation of the front, rear, top, and bottom side.

FIG. 1A illustrates an exemplary embodiment of the radio cover assembly's 108 main cover 102 in perspective view and the orientation of the front side or front panel 101, rear side 103, top side 109 and bottom side 105. The main cover 102 is configured in some embodiments wherein the front side or front panel 101 is facing the user and the rear side 103 is in contact with a handheld communication device 100 or 110. In some embodiments, the direction of attachment tab 114 between the handheld communication device 100 or 110 and the removable cover assembly 108 may differ between embodiments to be inserted or placed from the top side 109, rear side 103, bottom side 105, or front side or front panel 101 or any combination thereof of the handheld communications device 100 or 110. In the current exemplary embodiment, an attachment tab 114 is configured to be integrated into the rear side 103 of the main cover. In exemplary environments, such as rugged environments, the attachment tab 114 needs to be securely attached to the handheld communication devices 100 or 110 as the user is moving and adapting to changes in task requirements or environmental conditions changes.

In exemplary environments, such as rugged environments, the main cover 102 and interchangeable media layer 106 or 107 needs to be accessible to be removed from the radio cover assembly 108 when the accumulation of debris within the interchangeable media layer 106 or 107 of the radio cover assembly 108 has accumulated to an undesirable level. In some embodiments the interchangeable media layers may consist of materials of high-density 106 or low-density 107, allowing different particles of various sizes to pass through or to be stopped. In some embodiments, the high density 106 and low density 107 interchangeable media layers may comprise a plurality of the same or different interchangeable media layer 106 or 107. In some embodiments, the high density 106 and low density 107 further comprises at least one member of a media layer set consisting of: a metal screen layer, a metal mesh layer, a metal screen layer, a foam material layer, a solid plastic layer, a wood layer, an electrostatic discharge material layer, a rubber layer, a plastic mesh layer, a wood layer, a perforated plastic layer, a fabric layer, a wool layer, a nonporous material layer, and a urethane plastic layer. In the current exemplary embodiment, the high-density 106 and low-density 107 interchangeable media layers may shield the handheld communication devices 100 or 110 from detrimental environmental conditions including, but not limited to, the following: wind, rain, electromagnetic fields, fog, dew, dust, sand, living organisms, plant matter and many other conditions. The interchangeable media layer 106 or 107 in some embodiments may be removed or replaced between the handheld communication device 100 or 110 and the main cover 102. In some embodiments, at least one layer of media 106 or 107 is configured to be used for at least one member of a sound altering set consisting of: sound amplification, sound blocking, sound filtering, sound reducing, and sound collecting.

The gasket component 104 as shown in FIG. 1 of the current exemplary embodiment is utilized to space, align or cushion the interchangeable media layer 106 or 107 and main cover 102 as the radio cover assembly is attached to handheld communication devices 100 or 110. The gasket component 104 in some embodiments may be aligned to share a parallel face with any of the following sides of the main cover 102: the front side 101, rear side 103, top side 109 or bottom side 105. In some embodiments, the gasket component 104 of the main cover 102 is made from at least one member of a gasket material set consisting of: a metal, a rubber, a plastic, a wood, a foam, and a fabric.

Figure 2:
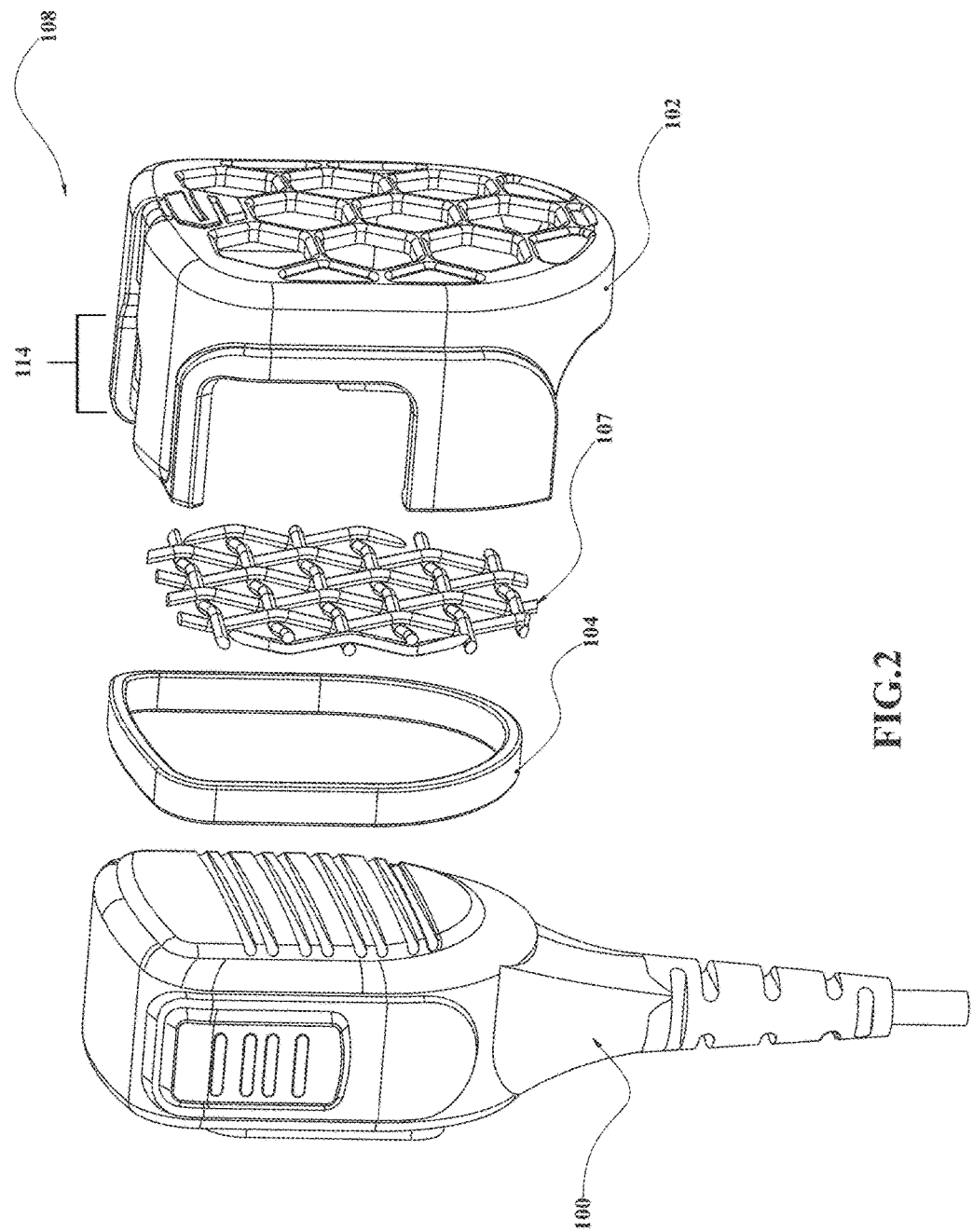
FIG. 2 shows an exemplary perspective view of one wired embodiment of the removable cover assembly.

FIG. 2 illustrates the current exemplary embodiment of the removable radio cover assembly 108 in an expanded view showing an embodiment with a wired handheld communication device 100 and a low-density interchangeable media layer 107.

Figure 3:
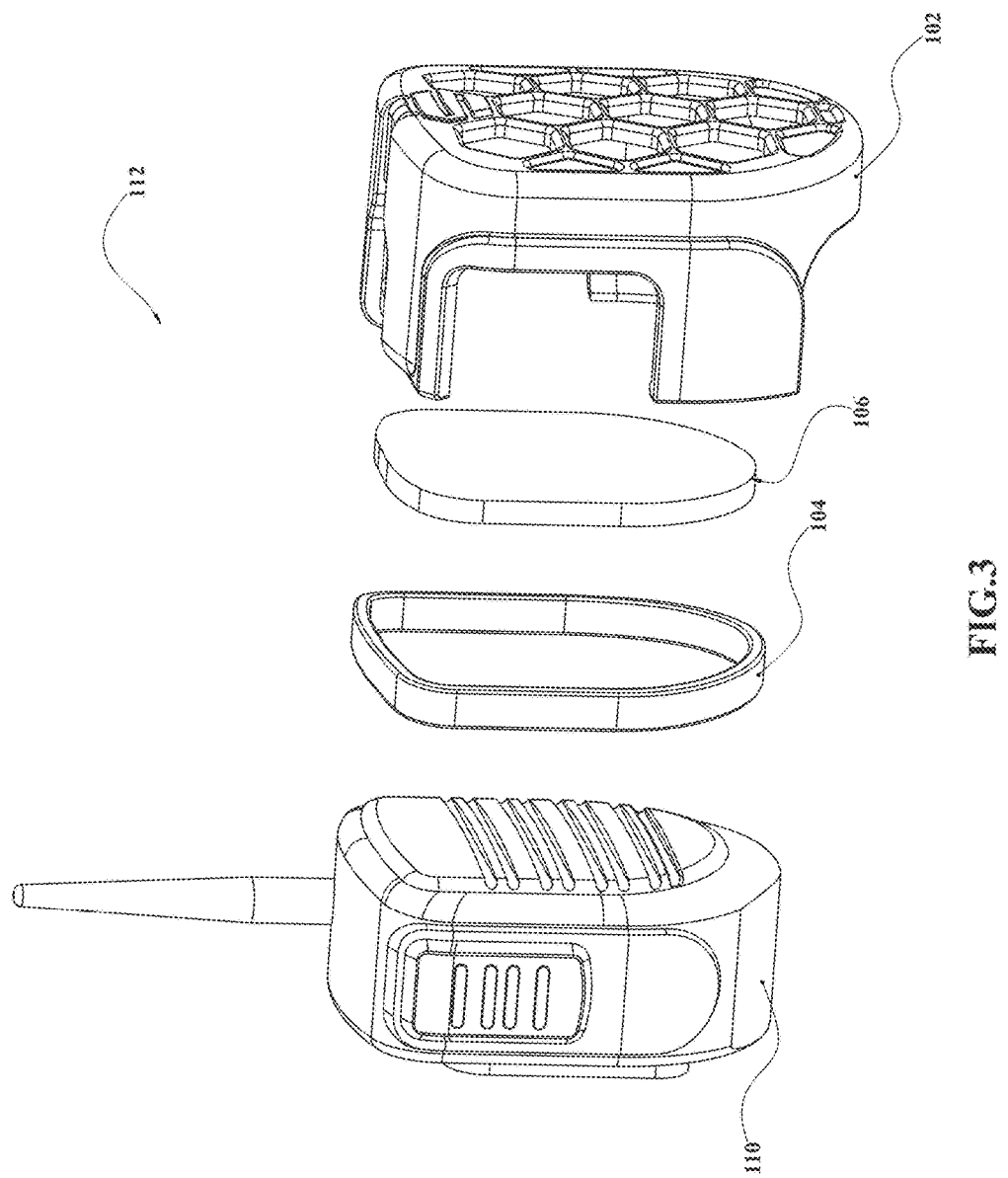
FIG. 3 shows an exemplary perspective view of one wireless embodiment of the removable cover assembly.

FIG. 3 illustrates the current exemplary wireless embodiment 110 of the removable radio cover assembly 108 in an expanded view showing an embodiment with a wireless handheld communication device and a high-density interchangeable media layer 106.

Figure 4:
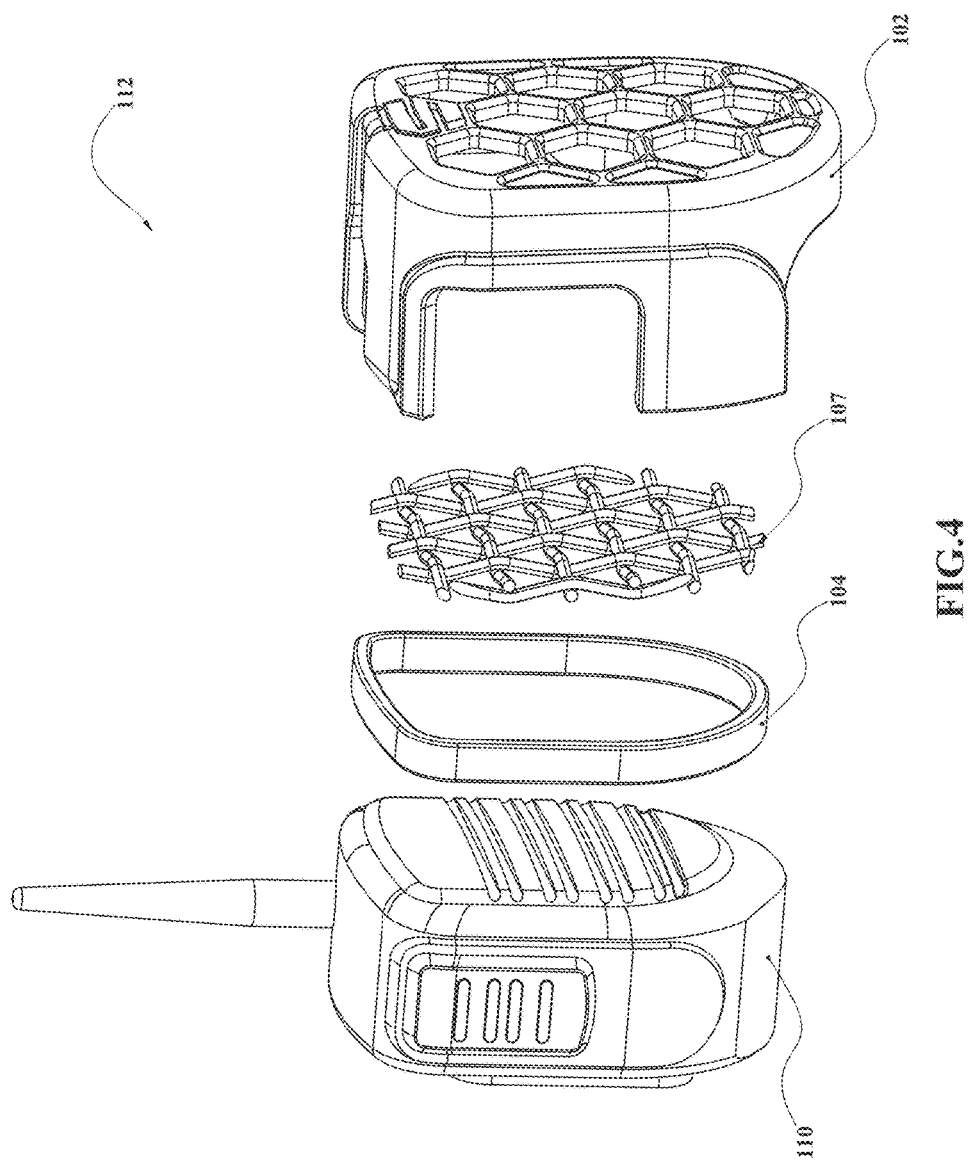
FIG. 4 shows an exemplary perspective view of one wireless embodiment of the removable cover assembly.

FIG. 4 illustrates the current exemplary wireless embodiment 110 of the removable radio cover assembly 108 in an expanded view showing an embodiment with a wireless handheld communication device and a low-density interchangeable media layer 107.

Figure 5:
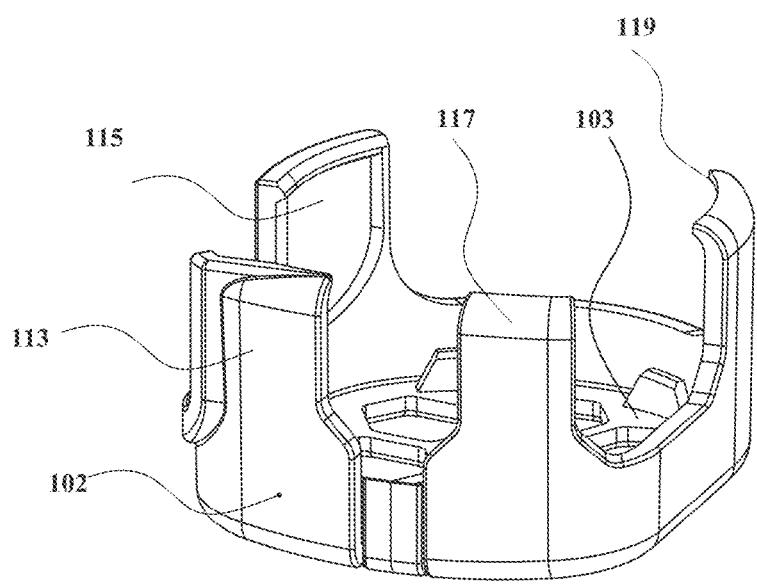
FIG. 5 shows an exemplary perspective view of one embodiment of the cover attachment means.

FIG. 5 is a perspective view oriented to show the current exemplary embodiment of the main cover 102 and the attachment tab 114 is integrated into the rear side 103 of the main cover 102. The first finger 113, a second finger 115, a third finger 117 and a fourth finger 119 of the main cover 102. In some embodiments, a first opening is formed, arranged between the first finger 113 and the second finger 115; wherein the first opening is sufficiently large to accommodate a push to talk button on a portable radio. In some embodiments, a second opening is formed, arranged between the second finger and the third finger; wherein the second opening is less than half the size of the first opening In some embodiments, a third opening arranged between the third finger and the fourth finger is formed; wherein the third opening is formed is approximately equal in size to the first opening. In some embodiments, a fourth opening, arranged between the fourth finger and the first finger is formed, wherein the fourth opening is twice the size of the second opening. In the current exemplary embodiment, the attachment tab 114 is a plastic clip that deflects to bend and retract around the housing of handheld communication devices 100 or 110. In some embodiments the attachment tab 114 may further comprises at least one member of an attachment set consisting of: a magnet, a clip, a slide-fit, a clamp, a spring, a heat-shrink material flange, a fastener, a spring, an elastic member, and an adhesive. In some embodiments, the main cover 102 or plurality of main covers may require external texture to grip the hand of the user. In exemplary embodiments, the external texture further comprises at least one member of a texture set consisting of: indentations, sandpaper, extrusions, knurling, a rough surface, bumps or any combination thereof. In some embodiments, the inside of the main cover 102 can further comprise a gasket around the outer edge of the push-to-talk radio. This gasket aids in excluding air from entering around the edges of the main cover 102. The gasket can comprise of at least one member of a gasket set: a rubber gasket, a O-ring, a rubber flange, a heat-shrink material flange, and a tape.

Figure 6:
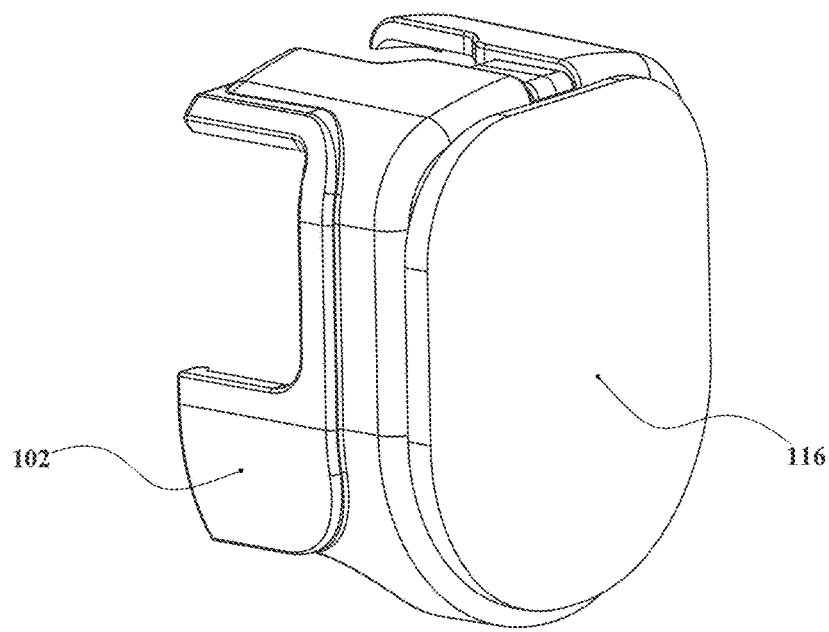
FIG. 6 shows an exemplary perspective view of one embodiment of the removable cover.

FIG. 6 illustrates an exemplary embodiment of the main cover 102 in a shielded solid embodiment 116 that protects the handheld communication device 100 or 110 from any passage of debris, air or sound. In some embodiments, the removable radio cover assembly may comprise of a plurality of main cover 102. For example, the main cover 102 may have a perforated front side 101 or may be a shielded solid embodiment 116 in other embodiments, or the radio cover assembly 108 may comprise a plurality of main cover 102 one perforated and one solid. In some embodiments, the perforated front side 101 of the main cover 102 include a plurality of perforations. The shape of the plurality of perforations in the front side 101 of the main cover 102 can be a perforation shape, by way of non-limiting example, a honeycomb shape, a square, a triangle, a rectangle, an octagon and an oval.

Figure 7:
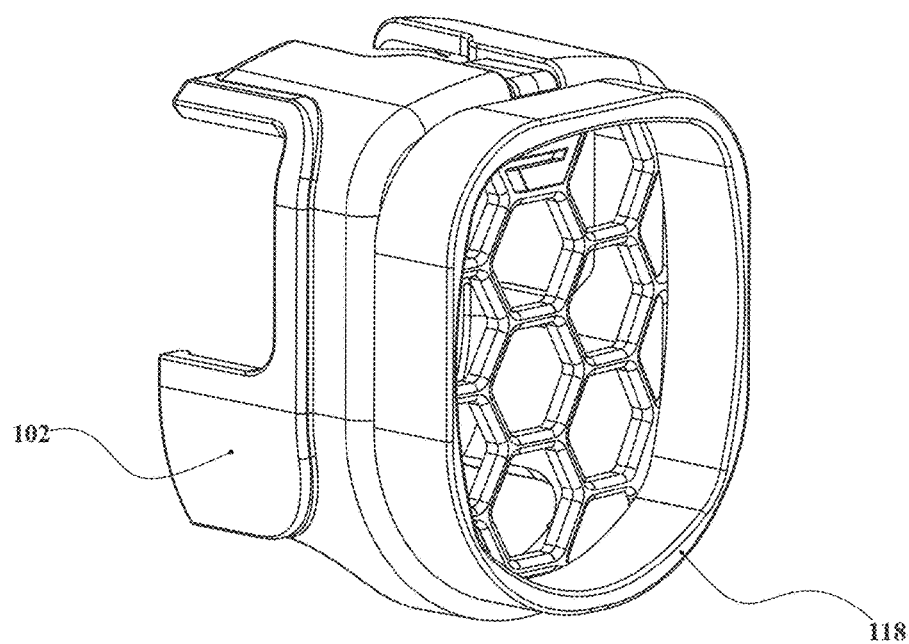
FIG. 7 shows an exemplary perspective view of one amplification embodiment of the removable cover.

FIG. 7 illustrates an exemplary embodiment of the main cover 102 in a rigid cupped embodiment 118. In some embodiments, the rigid cupped design 118 may assist the user in at least one of the following sound altering means: amplification, blocking, reducing, collecting or any combination thereof. For example, the rigid cupped embodiment may amplify communications otherwise not at a decibel level noticeable by the user. In some embodiments, the main cover is made from at least one member of a main cover material set consisting of: a metal, a rubber, a plastic, a wood, a foam, and a fabric.

Figure 8:
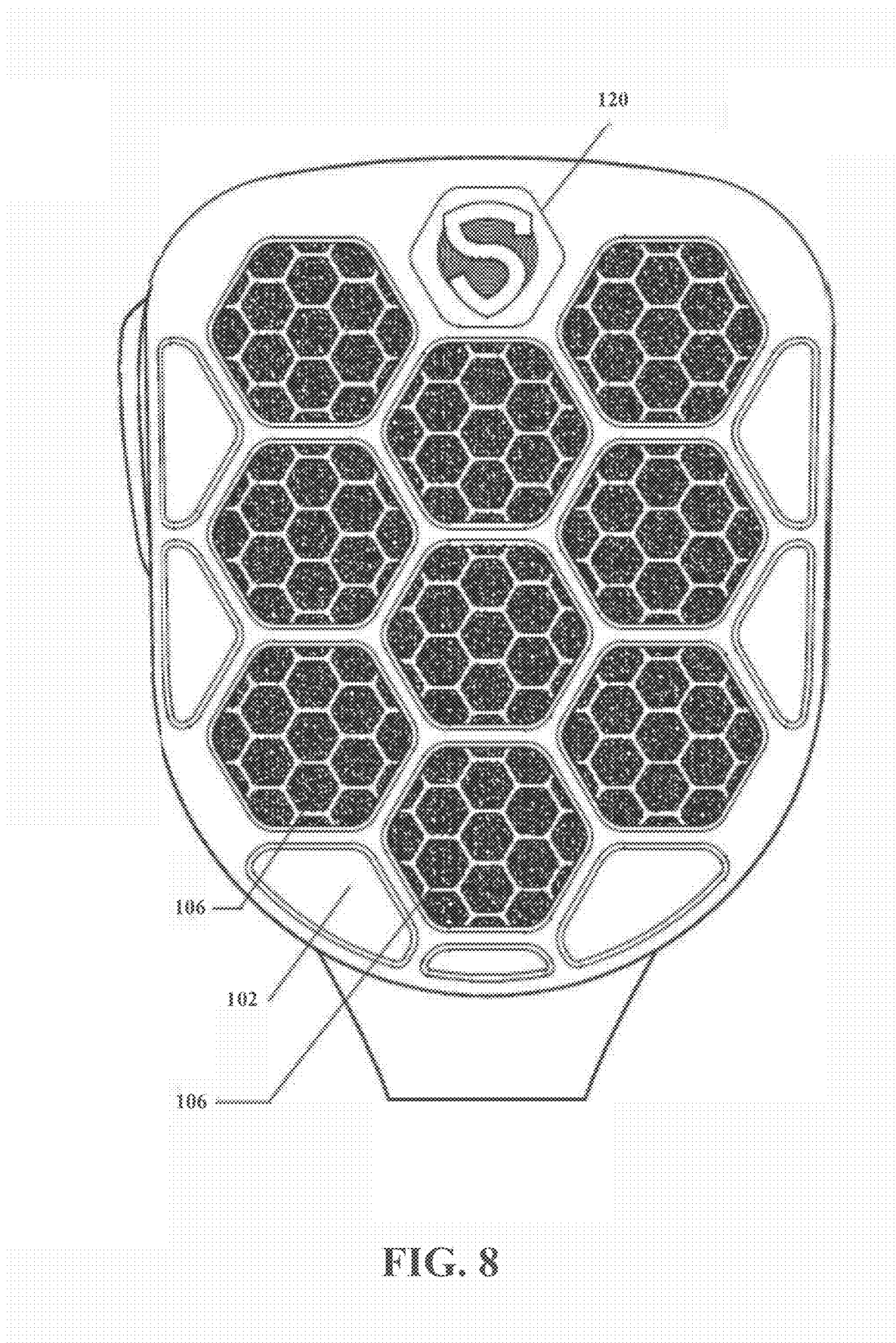
FIG. 8 shows an exemplary front view of one embodiment of the removable cover.

FIG. 8 illustrates an exemplary embodiment of the main cover 102 in a front view, showing the front side 101 of the main cover 102. In the current exemplary embodiment, the high-density interchangeable media layer 106 can be seen through physical honeycomb perforations in the main cover 102. In some embodiments, it may be desirable that the main cover further comprises at least one member of an identification set 120 consisting of: an alphanumeric identification, the user's name, a symbolic shape, a company brand, a numeric identification number, a QR code, a barcode, an RFID tag, or any combination thereof.

Figure 9:
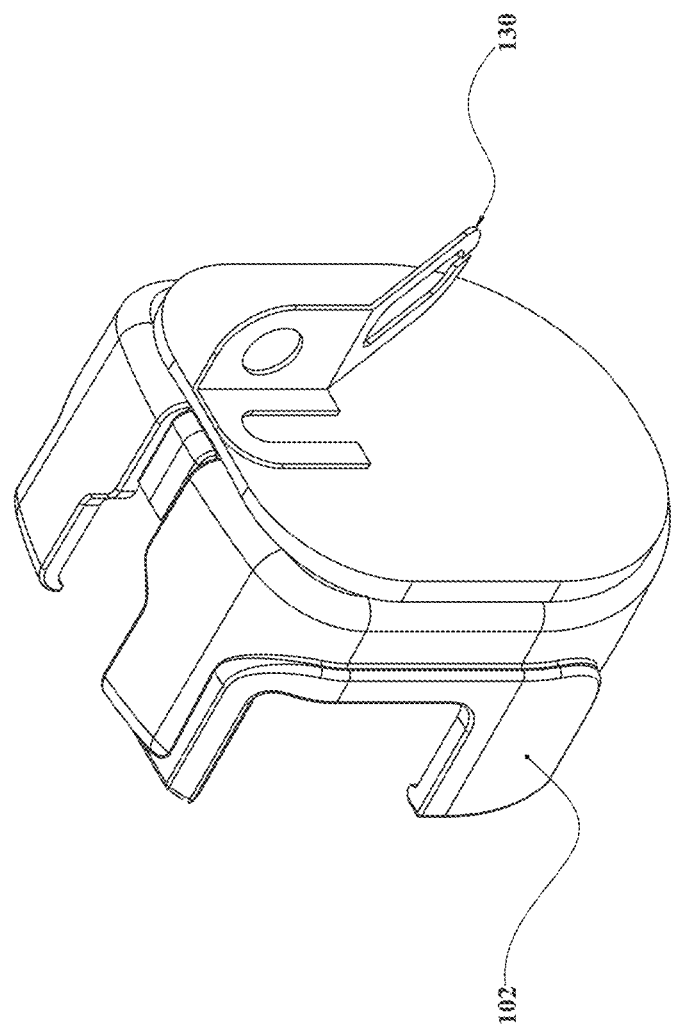
FIG. 9 shows an exemplary perspective view of one embodiment of the radio cover assembly and mounting assembly.

FIG. 9 shows an exemplary perspective view of one embodiment of the removable radio cover assembly 108 and mounting assembly 130. In certain environmental or working situations, the user may wish to mount or store the handheld communication device 100 or 110 and removable radio cover assembly 108 to at least one member of an adjacent set consisting of: a rigid structure and the push to talk radio. In some embodiments the adjacent set may comprise a location on the body of the user, a rigid structure or another handheld communication device. In some embodiments, the main cover 102 or plurality of main covers may include the mounting assembly 130. In some embodiments, the mounting assembly 130 further comprises at least one of a mounting attachment set consisting of: a clip, a tab, a magnet, a heat-shrink flange, a spring, and an elastic member.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A removable radio cover assembly for a push to talk radio, configured to be manipulated by a human user of the push to talk radio; the removable radio cover assembly comprising:
   a main cover having a front panel joined to a first finger, a second finger, a third finger and a fourth finger; wherein each finger extends away from the front panel;

wherein at least one finger further comprises an attachment tab that is configured to partially wrap around the push to talk radio;
a gasket, arranged along a main cover inside surface, between the first finger, the second finger, the third finger and the fourth finger; wherein the gasket aids in preventing air from entering through edges of the main cover;
a plurality of perforations in a main cover front side arranged in a perforation shape;
a interchangeable media layer, arranged on a rear side of the plurality of perforations and the gasket on the main cover;
a first opening, arranged between the first finger and the second finger; wherein the first opening is sufficiently large to accommodate a push to talk button on a portable radio;
a second opening, arranged between the second finger and the third finger; wherein the second opening is less than half the size of the first opening;
a third opening, arranged between the third finger and the fourth finger; wherein the third opening is approximately equal in size to the first opening;
a fourth opening, arranged between the fourth finger and the first finger; wherein the fourth opening is twice the size of the second opening.

2. The radio cover assembly of claim 1, wherein at least two fingers further comprise the attachment tab.

3. The radio cover assembly of claim 2, wherein the attachment tab further comprises at least one member of an attachment set consisting of: a magnet, a clip, a heat-shrink material flange, a slide-fit, a clamp, a spring, a fastener, an elastic member, and an adhesive.

4. The radio cover assembly of claim 3, wherein the attachment tab further comprises a portion attached to the push to talk radio.

5. The radio cover assembly of claim 4, wherein the push to talk radio is at least one member of a push to talk radio set consisting of; a satellite transceiver, a satellite phone, a CB radio, a walkie-talkie, a GPS device, a barcode scanner, a two-way radio, an RF device, an intercom device, a portable speaker, and a handheld microphone.

6. The radio cover assembly of claim 5, wherein the push to talk radio is powered by a battery.

7. The radio cover assembly of claim 4, wherein the push to talk radio is powered by a wire.

8. The radio cover assembly of claim 1, wherein the interchangeable media layer is removed and replaced with a second external layer of media.

9. The radio cover assembly of claim 8, wherein the interchangeable media layer further comprises at least one member of a media layer set consisting of: a metal screen layer, a metal mesh layer, a foam material layer, a solid plastic layer, a wood layer, an electrostatic discharge material layer, a rubber layer, a plastic mesh layer, a perforated plastic layer, a fabric layer, a wool layer, a nonporous material layer, and a urethane plastic layer.

10. The radio cover assembly of claim 9, the interchangeable media layer is configured to be used for at least one member of a sound altering set consisting of: sound amplification, sound blocking, sound filtering, sound reducing, and sound collecting.

11. The radio cover assembly of claim 1, wherein the gasket component is made from at least one member of a gasket material set consisting of: a metal, a plastic, a wood, a rubber, a foam, and a fabric.

12. The radio cover assembly of claim 1, wherein the main cover is made from at least one member of a main cover material set consisting of: a metal, a rubber, a plastic, a wood, a foam, and a fabric.

13. The radio cover assembly of claim 1, wherein the main cover further comprises at least one perforated opening.

14. The radio cover assembly of claim 1, wherein the main cover further comprises an external texture to grip a hand of the user.

15. The radio cover assembly of claim 14, wherein the external texture further comprises at least one member of a texture set consisting of: indentations, extrusions, knurling, a rough surface, and bumps.

16. The radio cover assembly of claim 1, wherein the main cover comprises a rigid cupped structure configured to be used for at least one member of a sound altering set consisting of: sound amplification, sound blocking, sound filtering, sound reducing, and sound collecting.

17. The radio cover assembly of claim 1, wherein the radio cover assembly further comprises: a mounting assembly joined to the main cover.

18. The radio cover assembly of claim 17, wherein the mounting assembly further comprises at least one of a mounting attachment set consisting of: a clip, a tab, a magnet, a spring, and an elastic member.

19. The radio cover assembly of claim 18, wherein the mounting assembly is immediately adjacent to at least one member of an adjacent set consisting of: a rigid structure and the push to talk radio.

20. The radio cover assembly of claim 1, further comprising a second cover, joined to the main cover.

21. The radio cover assembly of claim 1, wherein the main cover further comprises at least one member of an identification set consisting of: an alphanumeric identification, a human user's name, a symbolic shape, a company brand, a numeric identification number, a QR code, a barcode, and an RFID tag.

* * * * *